(12) United States Patent
Uhler et al.

(10) Patent No.: US 6,579,030 B2
(45) Date of Patent: Jun. 17, 2003

(54) SENSOR MOUNT ASSEMBLY

(75) Inventors: Gregory Allen Uhler, Columbus, IN (US); Chad Randall Pigg, Bloomington, IN (US)

(73) Assignee: ArvinMeritor, Inc., Troy, MI (US)

( * ) Notice: Subject to any disclaimer, the term of this patent is extended or adjusted under 35 U.S.C. 154(b) by 2 days.

(21) Appl. No.: 09/855,402

(22) Filed: May 15, 2001

(65) Prior Publication Data

US 2002/0172550 A1 Nov. 21, 2002

(51) Int. Cl.$^7$ .............................................. G01D 21/00
(52) U.S. Cl. ....................................... 403/348; 403/349
(58) Field of Search ................................ 403/348, 349; 73/866.5, 23.31–23.33; 439/546–549

(56) References Cited

U.S. PATENT DOCUMENTS

| | | | |
|---|---|---|---|
| 3,844,920 A | * 10/1974 | Burgett et al. ............... 204/428 |
| 4,040,930 A | * 8/1977 | Dillon ......................... 204/426 |
| 4,172,247 A | 10/1979 | Ikeura ......................... 338/34 |
| 4,193,965 A | 3/1980 | Cullingford et al. .......... 422/95 |
| 4,199,424 A | 4/1980 | Teitelbaum ............. 204/195 S |
| 4,443,781 A | 4/1984 | Ohta et al. .................... 338/34 |
| 4,478,067 A | 10/1984 | Ohta et al. ..................... 73/23 |
| 4,532,492 A | 7/1985 | Esper et al. ................... 338/34 |
| 4,883,643 A | 11/1989 | Nishio et al. ................ 422/94 |
| 5,546,787 A | 8/1996 | Hafele et al. ............... 73/23.31 |
| 5,627,306 A | 5/1997 | Yamauchi et al. ........... 73/23.2 |
| 5,644,093 A | * 7/1997 | Wright et al. ............ 248/205.3 |
| 5,689,059 A | 11/1997 | Oh et al. .................... 73/23.31 |
| 5,739,414 A | 4/1998 | Paulus et al. ............... 73/23.31 |
| 5,804,050 A | 9/1998 | Hayakawa et al. ......... 204/424 |
| 5,817,920 A | 10/1998 | Kuisell et al. ............. 73/23.31 |
| 5,821,401 A | 10/1998 | Awarzamani et al. ...... 73/23.32 |
| 5,827,415 A | 10/1998 | Gur et al. ................... 204/426 |
| 5,880,353 A | 3/1999 | Graser et al. ................ 73/23.2 |
| 5,886,248 A | 3/1999 | Paulus et al. ............... 73/23.31 |
| 5,955,656 A | 9/1999 | Graser et al. .............. 73/23.31 |
| 6,063,249 A | 5/2000 | Duce et al. .................. 204/424 |
| 6,065,359 A | * 5/2000 | Takanashi et al. ............. 73/129 |
| 6,070,865 A | * 6/2000 | Schroeder et al. ............ 269/47 |
| 6,082,175 A | 7/2000 | Yoshikawa et al. ........ 72/23.31 |
| 6,083,371 A | 7/2000 | Weyl et al. ................. 204/426 |
| 6,089,110 A | * 7/2000 | Pallotta et al. .............. 374/141 |
| 6,263,748 B1 | * 7/2001 | White ......................... 204/408 |
| 6,357,290 B1 | * 3/2002 | Asao et al. .................... 33/610 |
| 6,395,415 B1 | * 5/2002 | Hoehn et al. ................. 429/22 |

* cited by examiner

Primary Examiner—James R. Brittain
(74) Attorney, Agent, or Firm—Barnes & Thornburg

(57) ABSTRACT

An assembly for mounting a sensor to an exhaust flow system comprising a locking member defining a through hole and a body element engageable with the locking member. The locking member desirably defines a pair of slots, and the body element desirably includes a pair of tabs. The body element is receivable within the hole defined by the locking member and the tabs are receivable within the slots defined by the locking member. The body element is rotatable relative to the locking member from an unlocked position in which the tabs are aligned with the slots to a locked position to lock the body element to the locking member. The locking member may be in the form of a ring and an exhaust pipe, with the ring being welded to the exhaust pipe. The body element may be in the form of a sensor and a sensor mount disposed about the sensor. Each tab includes an engaging surface and the ring includes a pair of bearing surfaces to engage and act upon the engaging surfaces. Each bearing surface may include a camming surface for camming the body element during rotation of the body element, and may define a void for receiving the engaging surface of one of the tabs when the body element is rotated to the locked position. Each bearing surface desirably includes a barrier wall for maintaining the engaging surface within the void when the body element is rotated to the locked position.

19 Claims, 4 Drawing Sheets

SENSOR MOUNT ASSEMBLY

BACKGROUND AND SUMMARY OF THE INVENTION

The present relates to an assembly for mounting a sensor, such as, for example, an oxygen sensor or the like, to an automotive fluid flow system.

Oxygen sensors are used in automotive vehicles to sense the level of oxygen exhaust gases within an exhaust flow system. The oxygen sensors are typically mounted to the exhaust pipe of the exhaust flow system. The sensors should be durable, able to withstand vibration and jarring such as would occur during installation and normal vehicle operation and able to withstand shock from the occasional stone or other small road debris that may happen to be thrown at the sensor, for example, by the vehicle's tires.

It is often necessary to remove the oxygen sensor from the exhaust pipe during the life of the vehicle. Thus, the sensor should be mounted in a manner that is not only durable, but also in a manner that facilitates removal and replacement of the sensor. In this regard, oxygen sensors are typically mounted to the exhaust pipe with screw threads, which initially facilitates ready removal of the sensor from the exhaust pipe. During mounting, however, the threads can be damaged which prohibits disassembly and service. Additionally, even if the sensors are mounted properly, the threads tend to corrode after an extended period of time, which causes galling and makes it difficult to remove the oxygen sensor. Once removed, the oxygen sensor assembly often is damaged and must be replaced.

Accordingly, it is an object of the present invention to provide an assembly for mounting to an exhaust flow system an oxygen or other sensor that is strong and durable.

It is a further object of the present invention to provide such a mounting assembly that facilitates ready removal of the sensor even after extended use of the exhaust flow system.

In accordance with these and other objects, the present invention provides an assembly for mounting a sensor to an automotive fluid flow system, such as, for example, an exhaust flow system. The assembly comprises a locking member defining a through hole and a body element engageable with the locking member. The locking member also defines at least one slot, and the body element includes at least one tab. The body element is receivable within the hole defined by the locking member and the tab is receivable within the slot defined by the locking member. The body element is rotatable relative to the locking member from an unlocked position in which the tab is aligned with the slot to a locked position to lock the body element to the locking member. In an alternative embodiment, the locking member may instead have the at least one tab and the body element may instead comprise the at least one slot.

The locking member may have any suitable construction. In a preferred embodiment, for example, the locking member is in the form of a ring and an exhaust pipe, with the ring being welded to the exhaust pipe. The ring defines two slots, which extend longitudinally and which desirably are diametrically opposed from each other. The body element includes two lateral tabs, which desirably also are diametrically opposed from each other.

In a preferred embodiment, each tab includes an engaging surface and the ring includes a pair of bearing surfaces to engage and act upon the engaging surfaces. Each bearing surface may include a camming surface for camming the body element during rotation of the body element, and may define a void for receiving the engaging surface of one of the tabs when the body element is rotated to the locked position. Desirably, the mounting assembly also includes a metallic washer to the like [between the engaging surfaces an the bearing surface] that deforms during the camming and acts as a seal. Each bearing surface desirably includes a barrier wall for maintaining the engaging surface within the void when the body element is rotated to the locked position.

The present invention in accordance with a preferred embodiment provides many benefits. For example, because of its construction, the mounting assembly can be readily disassembled even after extended use of the exhaust flow system. In this regard, the mounting assembly in accordance with a preferred embodiment desirably does not include threads which can be damaged during assembly and which can corrode over time and tend to increase galling. Accordingly, the present invention facilitates ready mounting and dismounting of the sensor from the exhaust flow system throughout the lifetime of the exhaust flow system.

Other objects, advantages and novel features of the present invention will become apparent from the following detail description of the drawings when considered in conjunction with the accompanying drawings.

DETAILED DESCRIPTION OF THE DRAWINGS

Figure 1:
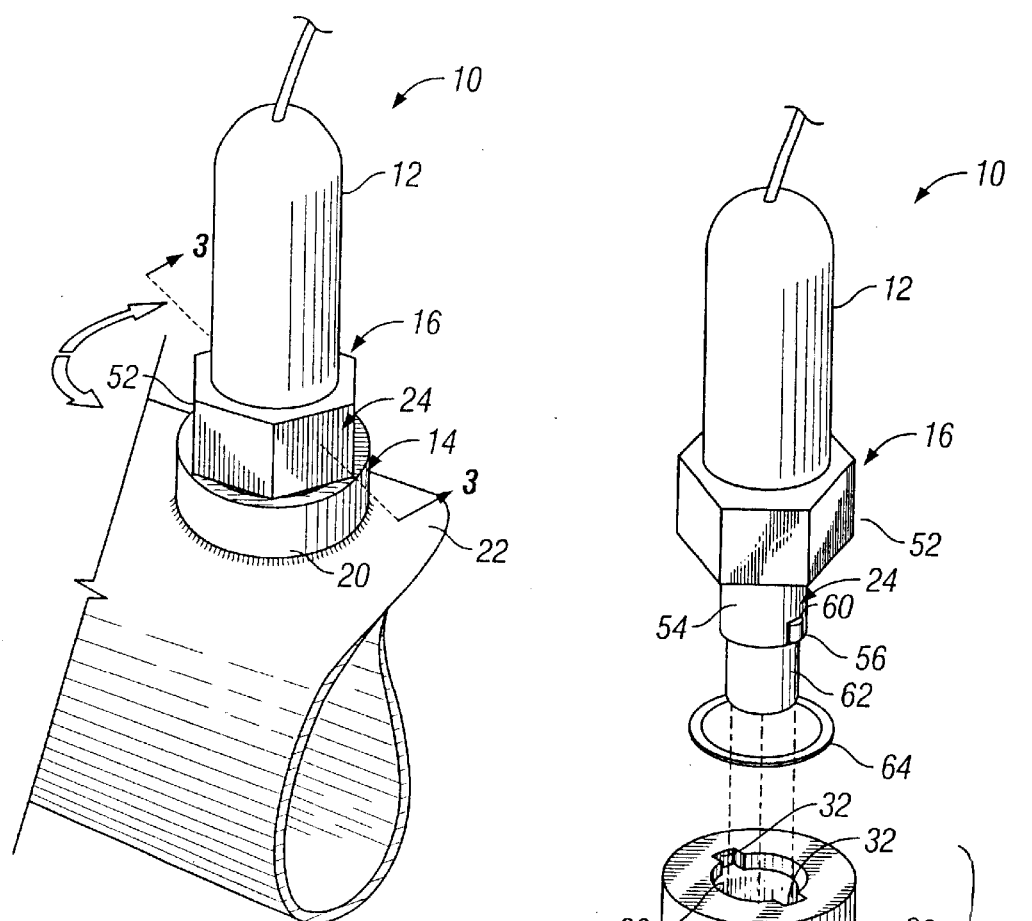
FIG. 1 is a broken perspective view illustrating an assembly for mounting a sensor to an exhaust flow system in accordance with an embodiment of the present invention.
Figure 2:
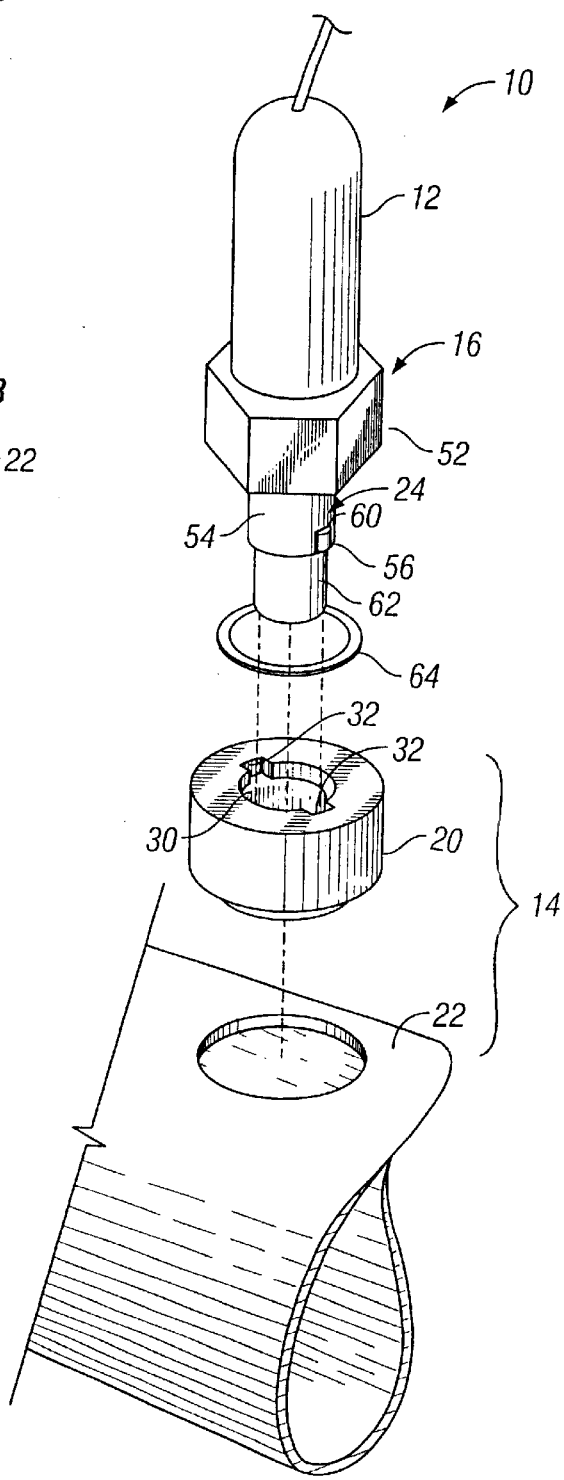
FIG. 2 is an exploded view of the mounting assembly of FIG. 1.
Figure 3:
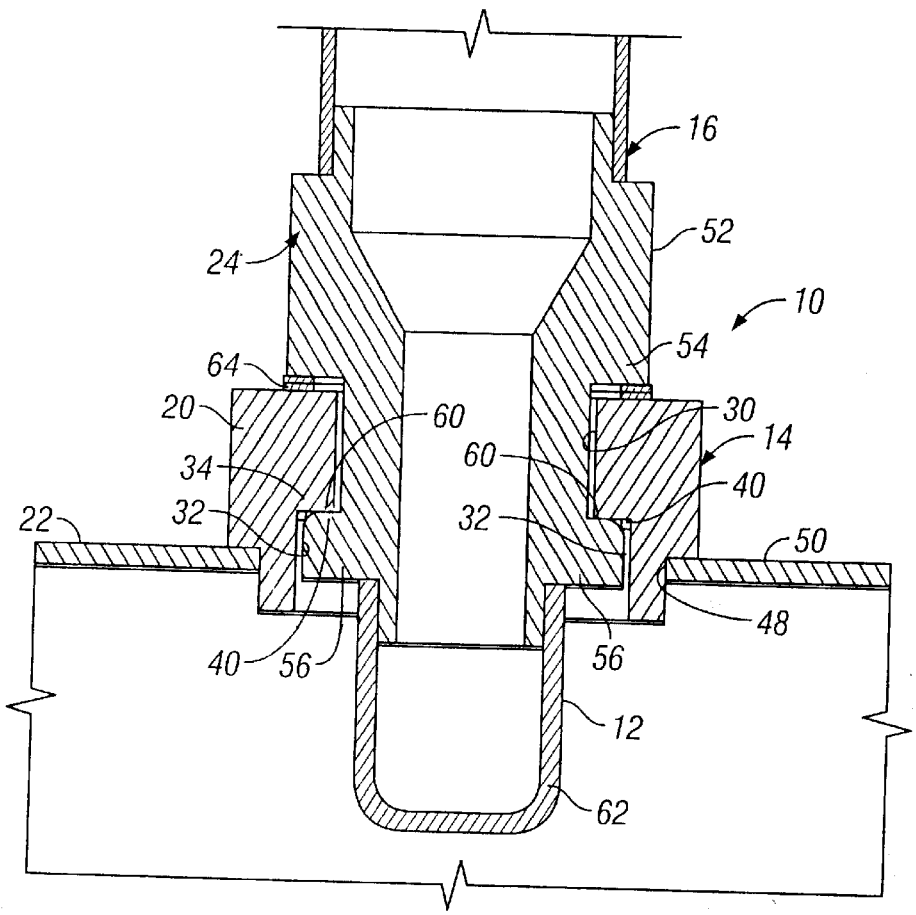
FIG. 3 is a cross section view taken along the lines 3—3 of FIG. 1.
Figure 4:
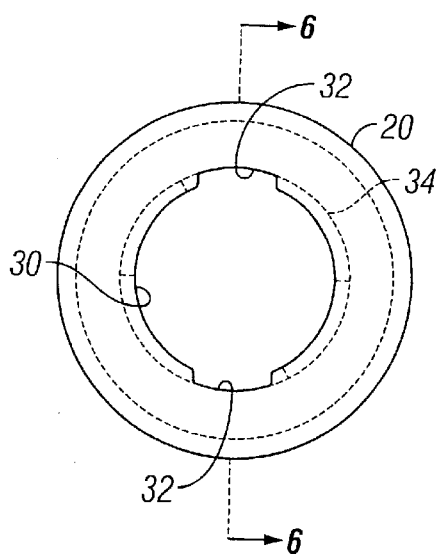
FIG. 4 is a top plan view of the ring of the locking member of the mounting assembly of FIG. 1.
Figure 5:
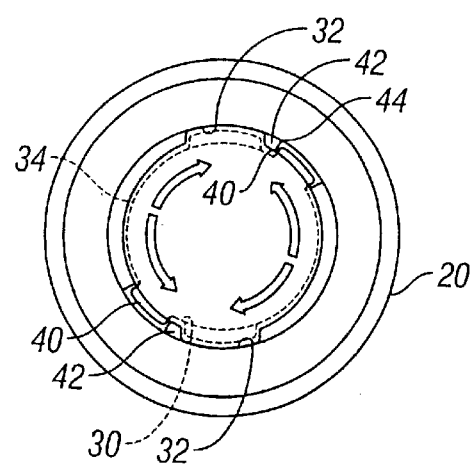
FIG. 5 is a bottom plan view of the ring of the locking member of the mounting assembly of FIG. 1.

FIG. 1 illustrates an assembly 10 for mounting a sensor 12 to an exhaust flow system in accordance with a preferred embodiment in the form of a locking member 14 and a body element 16. In the illustrated embodiment, the locking member 14 comprises a ring 20 and an exhaust pipe 22 to which the ring is welded, and the body element 16 includes a sensor mount 24 and the sensor 12.

The illustrated ring 20 is annular and defines a through hole 30 and a pair of longitudinally-extending diametrically-opposed slots 32. The ring 20 includes an internal annular shoulder 34 that includes a pair of bearing surfaces 40. Each bearing surface 40 includes a camming surface 42 and a barrier wall 44 that defines a void 46. The illustrated ring 20 is received within an opening 48 defined by the exhaust pipe 22. Additionally, the illustrated ring 20 includes an external annular shoulder 50 which may facilitate securement and welding of the ring to the exhaust pipe 22. The ring 20 instead may have any desirable external structure in accordance with alternative embodiments. It may, for example, have no external annular shoulder or may have a contoured external configuration. The ring 20 may be constructed in any suitable manner and may be constructed of any suitable material. It may, for example, be constructed of any suitable metal, such as powdered metal, or of plastic, ceramic, etc.

The illustrated sensor mount 24 is generally annular and includes a hexnut 52, a neck 54, a pair of diametrically-opposed lateral tabs 56 having engaging surfaces 60 for engaging the bearing surfaces 40 of the ring 20, and a sensor lead 62. The engaging surfaces 60 may have any suitable construction. In a preferred embodiment, for example, the engaging surfaces 60 are generally flat and extend at a slight angle to complement the camming surfaces 42 of the ring 20. The sensor mount 24 may be associated with the sensor 12 in any suitable manner. In the illustrated embodiment, for example, the sensor mount 24 is crimped or otherwise disposed about the sensor 12 in any suitable manner.

Figure 6A:
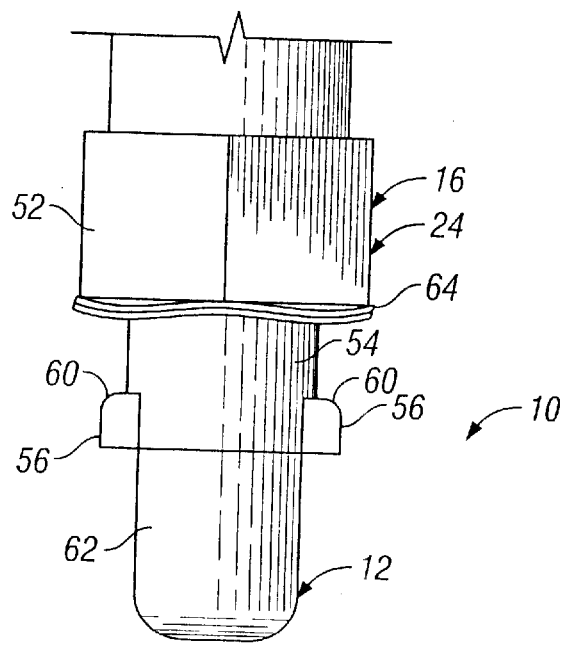
FIG. 6(a) is an operational view for assembling the mounting assembly of FIG. 1, including a cross section view taken along lines 6—6 of FIG. 1 and a broken view illustrating the body element and the washers of the mounting assembly before the body element is received by the hole of the ring.
Figure 6B:
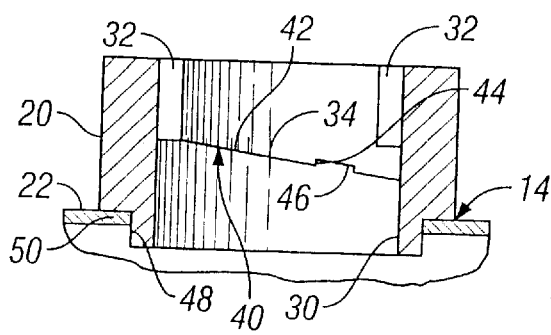
FIG. 6(b) is a further operational view of the mounting assembly of FIG. 6(a) illustrating the body element received by the hole of the ring and the locking tabs of the body element received by the slots of the ring.
Figure 6B:
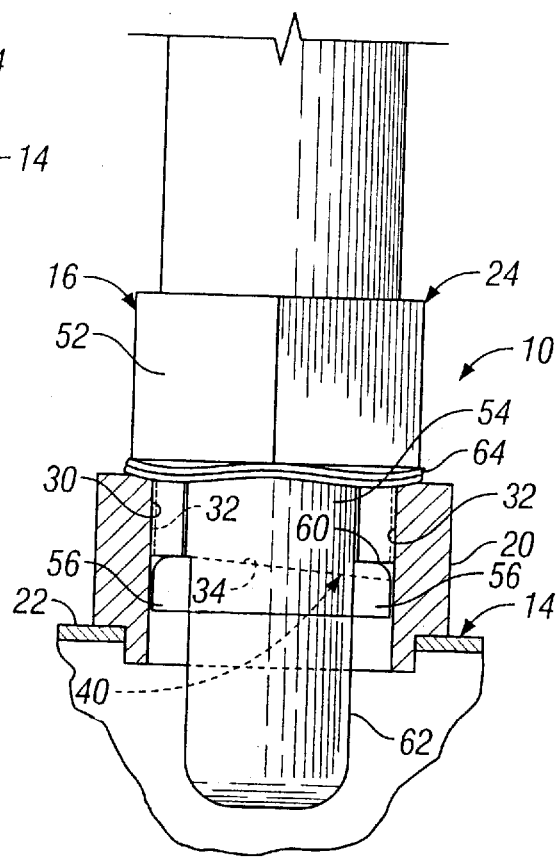
Figure 6C:
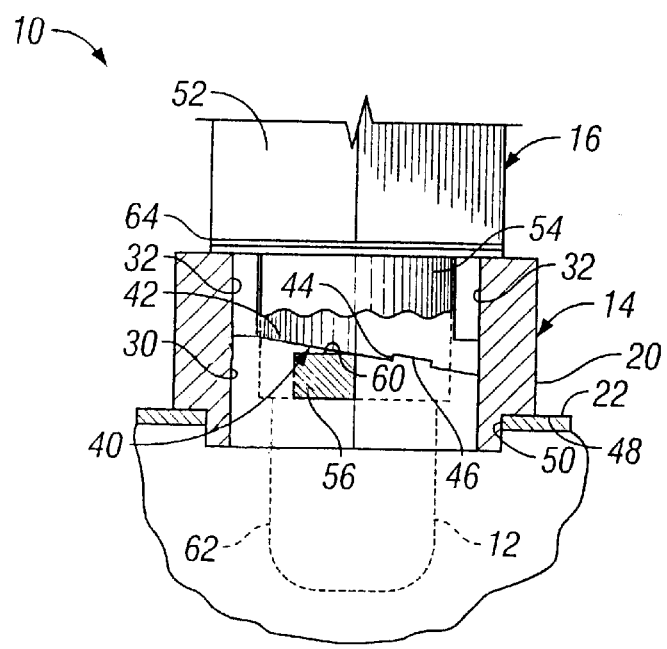
FIG. 6(c) is a further operational view of the mounting assembly of FIGS. 6(a) and 6(b) illustrating the rotation of the body element from the unlocked position toward the locked position and illustrating schematically one of the locking tabs of the body element in engagement with one of the bearing surfaces of the ring.
Figure 6D:
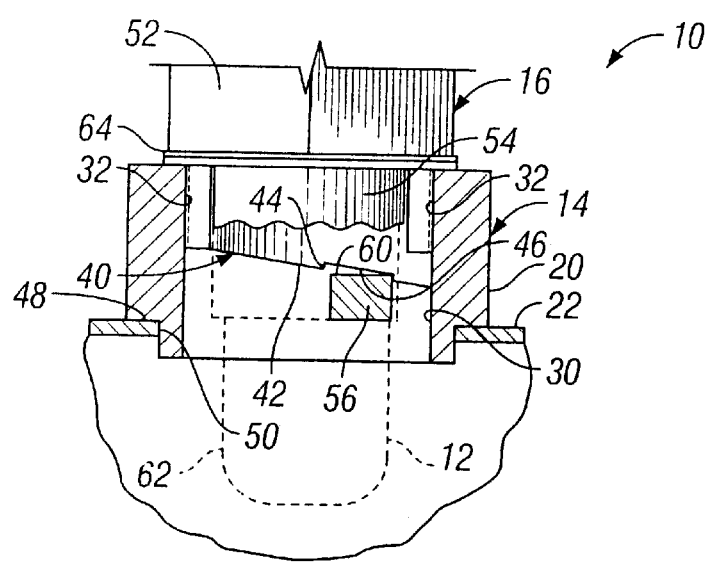
FIG. 6(d) is a further operational view of the mounting assembly of FIGS. 6(a)–6(c) illustrating the body element rotated to the locked position and illustrating schematically one of the locking tabs of the body element received in the void defined by one of the bearing surfaces of the ring.

In accordance with a preferred embodiment, the mounting assembly may be assembled by first aligning the tabs 56 of the body element 16 with the slots 32 of the ring 20 (FIG. 6(a)), and then inserting the body element into the hole of the ring (FIG. 6(b)). After the body element 16 is received by the hole 30, the body element can then be rotated by applying torque to the hexnut 52, causing the body element to rotate and causing the bearing surfaces 40 to act upon the engaging surfaces 60 such that the engaging surfaces 60 are cammed by camming surfaces 42 towards the voids 46 (FIG. 6(c)), and then into the voids 46 (FIG. 6(d)). Once the engaging surfaces 60 are received by the voids 46, the body element 16 is locked in place by the barrier walls 44 and remains locked in place until a reverse torque is applied to the body element of sufficient magnitude to cause the engaging surfaces to ride back over the barrier walls and back down the camming surfaces 42. Thereafter, when the tabs 56 are aligned with the slots 32, the body element 16 can be removed from the hole 30 to disengage it from the ring 20. The body element 16 thereafter can be re-engaged with the locking member 14 as described above. The degree of rotation of the body element 16 from the unlocked to the locked position may be of any suitable magnitude. In the illustrated embodiment, for example, the degree of rotation of the body element 16 from the unlocked position to the locked position is roughly 45 degrees.

Desirably, a seal is included between the body element 16 and the ring 20 when the body element is rotated to the locked position. In the illustrated embodiment, for example, a metallic compression washer 64 [62] is included which compresses and deforms when the body element 16 is rotated toward the locked position to form a metallic seal. The deformation desirably occurs [between the engaging surfaces 60 and the camming surfaces 42] during rotation of the body element 16.

The locking member 14 and the body element 16 may have any other suitable construction in accordance with alternative embodiments of the invention. For example, the locking member may instead be in the form of an exhaust pipe that defines the through hole and the one or more slots for receiving the one or more tabs of the body element or that includes other associated structure that defines the hole and the one or more slots. Additionally, alternatively, the locking member may include the one or more tabs and the body element may define the one or more slots. The body element may comprise any suitable sensor mount structure that may be associated with the sensor in any suitable manner or that may be a part of the sensor.

The sensor 12, including its housing, may have any suitable construction. The sensor desirably is in the form of an oxygen sensor, but, instead, may be a nitrogen oxide sensor, hydrocarbon sensor, temperature sensor or any other sensor that might be used with an automobile fluid flow system. The sensor mount assembly in accordance with the present invention may be used to mount a sensor to any type of automotive fluid system, including, for example, any type of exhaust flow system, gas flow system induction flow system, etc.

Although the invention has been described and illustrated in detail with reference to preferred embodiments, it is to be clearly understood that the same is by way of illustration and example only, and is not to be taken by way of limitation. The spirit and scope of the present invention are to be limited only by terms of the appended claims.

The claimed invention is:

1. An assembly for mounting a sensor to an automotive fluid flow system, the assembly comprising:
   a locking member defining a through hole; and
   a body element receivable within the hole and engageable with the locking member;
   one of the locking member and the body element defining a slot and the other of the locking member and the body element having at least one tab receivable within the slot, the body element being rotatable relative to the locking member from an unlocked position in which the body element is received within the hole and the tab is aligned with the slot to a locked position to lock the body element to the locking member; and wherein the tab includes an engaging surface and wherein the one of the locking member and the body element includes a rigid bearing surface to engage the engaging surface of the tab during rotation of the body element from the unlocked position to the locked position.

2. The assembly of claim 1 wherein the bearing surface includes a camming surface for camming the other of the locking member and the body element during rotation of the body element from the unlocked position to the locked position.

3. The assembly of claim 2 further including at least one deformable washer between the locking member and the body element adapted to deform during rotation of the body element from the unlocked position to the locked position.

4. The assembly of claim 1 wherein the bearing surface defines a void for receiving the engaging surface when the body element is rotated to the locked position.

5. The assembly of claim 4 wherein the bearing surface includes a barrier wall defining the void for maintaining the engaging surface within the void when the body element is rotated to the locked position.

6. The assembly of claim 1 wherein the bearing surface includes a camming surface for camming the other of the locking member and the body element during rotation of the body element from the unlocked to the locked position, and a barrier wall defining a void for receiving the engaging surface when the body element is rotated to the locked position, the barrier surface maintaining the engage surface within the void when the body element is rotated to the locked position.

7. The assembly of claim 1 wherein the other of the locking member and the body element comprises two lateral tabs and wherein the one of the locking member and the body element defines two slots.

8. The assembly of claim 1 wherein the locking member comprises a ring.

9. The assembly of claim 8 wherein the locking member comprises an exhaust pipe, the ring being welded to the exhaust pipe.

10. The assembly of claim 1 wherein the locking member comprises an exhaust pipe.

11. The assembly of claim 1 wherein the body element comprises a sensor mount disposed about the sensor.

12. The assembly of claim 1 wherein the body element includes the sensor.

13. The assembly of claim 1 wherein the one of the locking member and the body element comprises the locking member and the other of the locking member and the body element comprises the body element.

14. An assembly for mounting a sensor to an exhaust flow system, the assembly comprising:
   a locking member defining a through hole and a pair of slots; and
   a body element engageable with the locking member and having a pair of tabs, the body element receivable within the hole defined by the locking member and the tabs receivable within the slots defined by the locking member, the body element being rotatable relative to the locking member from an unlocked position in which the tabs are aligned with the slots to a locked position to lock the body element to the locking member; wherein each tab includes an engaging surface and wherein the locking member includes a pair of rigid bearing surfaces, each rigid bearing surface adapted to engage the engaging surface of a respective tab during rotation of the body element from the unlocked position to the locked position.

15. The assembly of claim 14 wherein each bearing surface includes a camming surface for camming the body element during rotation of the body element from the unlocked position to the locked position.

16. The assembly of claim 15 further including a deformable washer between the locking member and the body element adapted to deform when the body element is rotated to the locked position.

17. The assembly of claim 14 wherein each bearing surface defines a void for receiving the engaging surface of the respective tab when the body element is rotated to the locked position and wherein each bearing surface includes a barrier wall for maintaining the engaging surface within the void when the body element is rotated to the locked position.

18. The assembly of claim 14 wherein the lateral tabs are diametrically opposed from each other and the slots are diametrically opposed from each other.

19. An assembly for mounting a sensor to an exhaust flow system, the assembly comprising:
   a locking member defining a through hole and a pair of slots and including a pair of rigid bearing surfaces, each rigid bearing surface having a camming surface and a barrier wall defining a void;
   a body element engageable with the locking member and having a pair of tabs, the body element receivable within the hole defined by the locking member and the tabs receivable within the slots defined by the locking member, the body element being rotatable relative to the locking member from an unlocked position in which the tabs are aligned with the slots to a locked position to lock the locking member to the body element, each tab including an engaging surface that engages and is acted upon by a respective rigid bearing surface during rotation of the body element from the unlocked position to the locked position such that the camming surface of the respective rigid bearing surface cams the body element during rotation of the body element to the locked position, and the barrier wall of the respective barrier surface maintains the engaging surface within the void when the body element is rotated to the locked position; and
   at least one deformable washer between the locking member and the body element adapted to deform during rotation of the body element from the locked position to the unlocked position.

* * * * *